US012670698B2

(12) United States Patent
Okushiro

(10) Patent No.: US 12,670,698 B2
(45) Date of Patent: Jun. 30, 2026

(54) MACHINE LEARNING DEVICE, INFERENCE DEVICE, AND NON-TRANSITORY PROGRAM RECORDING MEDIUM

(71) Applicant: JVCKENWOOD Corporation, Yokohama (JP)

(72) Inventor: Hidetaka Okushiro, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 379 days.

(21) Appl. No.: 18/336,080

(22) Filed: Jun. 16, 2023

(65) Prior Publication Data

US 2023/0360369 A1 Nov. 9, 2023

Related U.S. Application Data

(63) Continuation of application No. PCT/JP2022/022868, filed on Jun. 7, 2022.

(30) Foreign Application Priority Data

Sep. 24, 2021 (JP) ................................. 2021-155938

(51) Int. Cl.
*G06V 10/77* (2022.01)
(52) U.S. Cl.
CPC .................................... *G06V 10/77* (2022.01)
(58) Field of Classification Search
None
See application file for complete search history.

(56) References Cited

U.S. PATENT DOCUMENTS

2022/0405605 A1* 12/2022 Yokoyama ................ G06T 7/00

FOREIGN PATENT DOCUMENTS

JP H06174689 A 6/1994

OTHER PUBLICATIONS

International Search Report from International Application No. PCT/JP2022/022868 mailed Aug. 16, 2022, 4 pages.
A. Sharma, et al., "DeepInsight: A methodology to transform a non-image data to an image for convolution neural network architecture", Scientific Reports, Aug. 6, 2019, vol. 9, No. 1., 7 pages, XP055819564.
A. Sharma, et al., "DeepInsight:A methodology to transform a non-image data to an image for convolution neural network architecture—Supplemental information with paper", Scientific Reports, vol. 9, No. 1, Aug. 6, 2019, XP093165437, 12 pages.

(Continued)

*Primary Examiner* — Leon Flores
(74) *Attorney, Agent, or Firm* — Shih IP Law Group, PLLC

(57) ABSTRACT

A machine learning method includes: a first principal component analysis step configured to perform principal component analysis on learning data so as to thereby generate two or more principal components of the learning data; a first image data generation step configured to generate virtual image data by assigning, from among the two or more principal components, the first principal component to the X coordinate of an XY plane and the second principal component to the Y coordinate of the XY plane; and a learning step configured to generate a trained model by performing machine learning using the image data as input data.

6 Claims, 9 Drawing Sheets

(56)        References Cited

OTHER PUBLICATIONS

B. Kovalerchuk, et al., "Solving Non-image Learning Problems by
Mapping to Images", 2020 24th International Conference Informa-
tion Visualization (IV), IEEE, Sep. 7, 2020, 6 pages, XP033886484.
European Office Action mailed Jun. 7, 2024 from EP Application
No. 22872471.2, 17 pages.

* cited by examiner

FIG. 2

SOURCE = FLOWER A

| | SENSOR 1 | SENSOR 2 | SENSOR 3 | SENSOR 4 | SENSOR 5 | SENSOR 6 | SENSOR 7 | SENSOR 8 |
|------|------|------|------|------|------|------|------|------|
| 1 | 10 | 12 | 104 | 521 | 136 | 11 | 75 | 894 |
| 2 | ⋮ | ⋮ | ⋮ | ⋮ | ⋮ | ⋮ | ⋮ | ⋮ |
| 3 | ⋮ | ⋮ | ⋮ | ⋮ | ⋮ | ⋮ | ⋮ | ⋮ |
| 4 | ⋮ | ⋮ | ⋮ | ⋮ | ⋮ | ⋮ | ⋮ | ⋮ |
| 1998 | ⋮ | ⋮ | ⋮ | ⋮ | ⋮ | ⋮ | ⋮ | ⋮ |
| 1999 | ⋮ | ⋮ | ⋮ | ⋮ | ⋮ | ⋮ | ⋮ | ⋮ |
| 2000 | ⋮ | ⋮ | ⋮ | ⋮ | ⋮ | ⋮ | ⋮ | ⋮ |

FLOWER A

Class 0 of Black [50pics]

PERFUME B

Class 1 of RGB [50pics]

FABRIC SOFTENER C

Class 2 of Black [50pics]

MACHINE LEARNING DEVICE, INFERENCE DEVICE, AND NON-TRANSITORY PROGRAM RECORDING MEDIUM

CROSS REFERENCE TO RELATED APPLICATION

This application is a continuation of application No. PCT/JP2022/22868, filed on Jun. 7, 2022, and claims the benefit of priority from the prior Japanese Patent Application No. 2021-155938, filed on Sep. 24, 2021, the entire content of which is incorporated herein by reference.

BACKGROUND OF THE INVENTION

1. Field of the Disclosure

The present invention relates to a machine learning device, an inference device, and a non-transitory program recording medium.

2. Description of the Related Art

As neural networks for image recognition, GoogLeNet, ResNet, Yolo, etc., have been proposed. These technologies allow for the recognition of a specific object in an image and infer what kind of object it is, using a model learned by deep learning.

Principal Component Analysis (PCA) is known as a method for discovering components with large variance in the data that greatly express the characteristics of an analysis target (hereinafter referred to as "principal components") from data in a large number of dimensions that are correlated. Using this method allows for a reduction in the number of data dimensions in machine learning.

Further, a stochastic resonance phenomenon is known as a technique for extracting a hidden signal by applying noise to a weak signal buried in noise (e.g., Patent Literature 1).

Patent Literature 1

Japanese Patent Application Publication No. H6-174689

In general, a lot of man-hours, time, and high skills are required to construct and verify neural networks for the purpose of inferring the state of a system. Here, attention is paid to the fact that a neural network technology for image recognition has been established as mentioned above. If such neural networks for image recognition can be handled for data other than images, it is expected that the construction and verification of the neural networks will become easier. In order to achieve this, the problem is to convert data other than images into a format suitable for input to a neural network for image recognition.

SUMMARY OF THE INVENTION

A machine learning device according to one embodiment of the present invention includes: a first principal component analysis unit configured to perform principal component analysis on learning data so as to thereby generate two or more principal components of the learning data; a first image data generation unit configured to generate virtual image data by assigning, from among the two or more generated principal components, the first principal component to the X coordinate of an XY plane and the second principal component to the Y coordinate of the XY plane; and a learning unit configured to generate a trained model by performing learning using a neural network using the image data as input data.

Another embodiment of the present invention relates to an inference device. This device includes: a second principal component analysis unit that performs principal component analysis on observation data so as to thereby generate two or more principal components of the observation data; a second image data generation unit that generates virtual image data by assigning, from among the two or more principal components, the first principal component to the X coordinate of an XY plane and the second principal component to the Y coordinate of the XY plane; and an inference unit that performs inference using a trained model using the image data as input data.

Still another embodiment of the present invention relates to a non-transitory program recording medium comprising a trained model. This trained model is generated by: performing principal component analysis on learning data so as to thereby generate two or more principal components of the learning data; generating virtual image data by assigning, from among the two or more generated principal components, the first principal component to the X coordinate of an XY plane and the second principal component to the Y coordinate of the XY plane; and performing machine learning using the image data as input data.

Optional combinations of the aforementioned constituting elements and implementations of the invention in the form of methods, apparatuses, systems, recording mediums, and computer programs may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 2 is a diagram illustrating a set of data input to a first principal component analysis unit of the machine learning device of FIG. 1;

FIG. 3A is a virtual image when the odor source is flower A, FIG. 3B is a virtual image when the odor source is perfume B, and FIG. 3C is a virtual image when the odor source is fabric softener C;

FIG. 6A is a virtual image when the odor source is flower A, FIG. 6B is a virtual image when the odor source is perfume B, and FIG. 6C is a virtual image when the odor source is fabric softener C;

DETAILED DESCRIPTION

Figure 1:
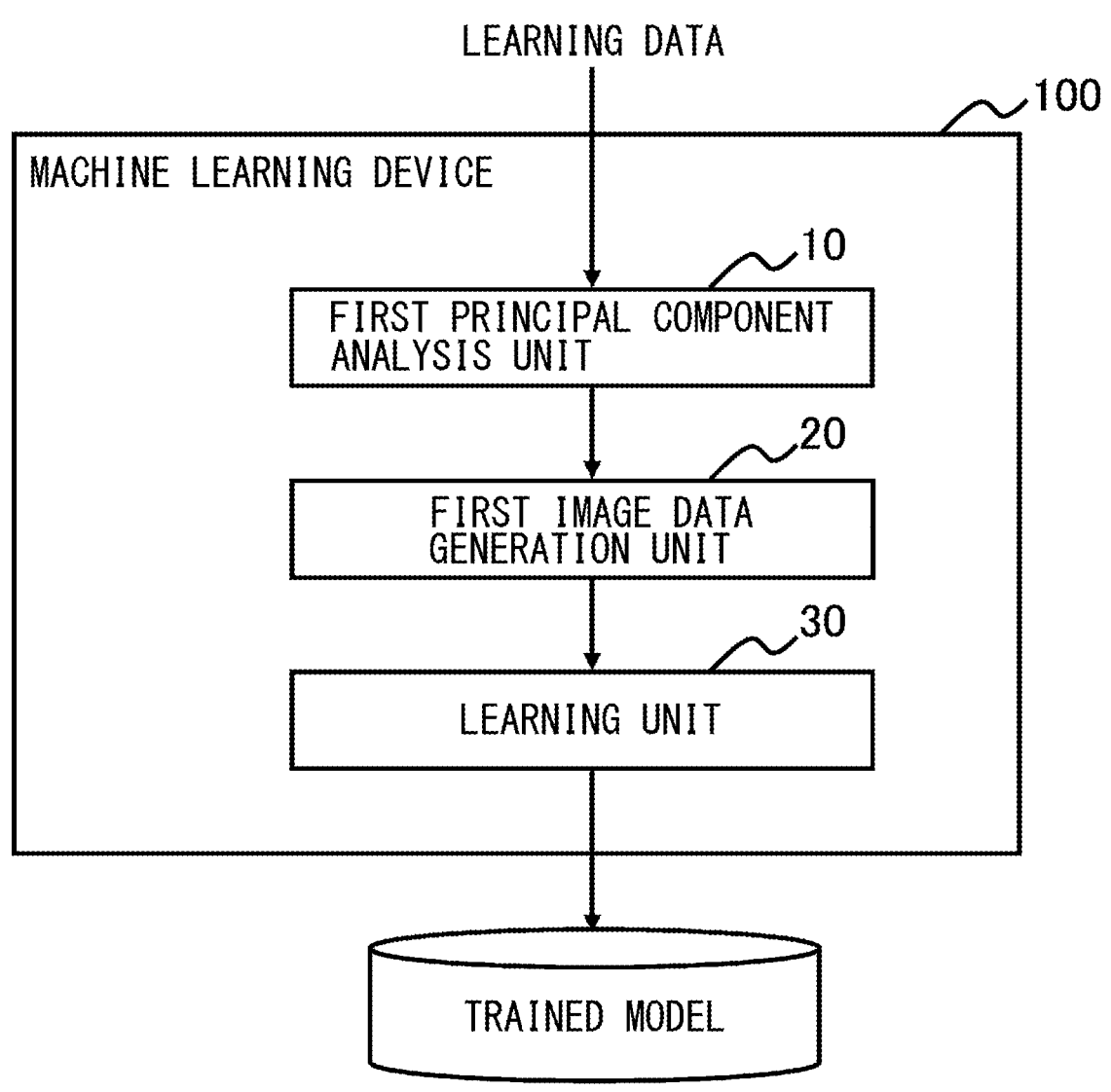
FIG. 1 is a functional block diagram of a machine learning device according to the first embodiment.

Hereinafter, the present invention will be described based on preferred embodiments with reference to each drawing. The dimensions of components in the drawings are enlarged or reduced as appropriate to facilitate understanding. Some of the elements in each figure may be omitted if they are not important for explanation. Terms including ordinal numbers (first, second, etc.) are used to explain various constituting elements, but the terms are used merely for the purpose of distinguishing one constituting element from the other constituting elements and shall not limit the constituting elements.

First Embodiment

FIG. 1 is a functional block diagram of a machine learning device 100 according to the first embodiment. The machine learning device 100 includes a first principal component analysis unit 10, a first image data generation unit 20, and a learning unit 30.

Data from outside is input to the first principal component analysis unit 10 as learning data. By performing principal component analysis on this data, the first principal component analysis unit 10 generates two or more principal components of the learning data. The first image data generation unit 20 assigns, from among two or more principal components generated by the first principal component analysis unit 10, the first principal component to the X coordinate on the XY plane and the second principal component to the Y coordinate on the XY plane and thereby generates virtual image data. The learning unit 30 generates a trained model by performing learning using a neural network while using the image data generated by the first image data generation unit 20 as input data.

The operation of the machine learning device 100 for generating a trained model for inferring the state of a system will be specifically explained below, using odor data as an example of learning data to determine what the odor source is that exists in the space.

Odor data from eight odor sensors (sensor 1 to sensor 8) arranged outside the machine learning device 100 is input to the first principal component analysis unit 10. The odor sensors are assumed to have high sensitivity to the following odor components, respectively.

Sensor 1: methane
Sensor 2: ethane
Sensor 3: propane
Sensor 4: acetic acid
Sensor 5: ethanol
Sensor 6: toluene
Sensor 7: hydrogen sulfide
Sensor 8: acetaldehyde In other words, it can be considered that the strength of each of the above eight odor components is input to the first principal component analysis unit 10. The first principal component analysis unit 10 performs principal component analysis on these and generates the first principal component and the second principal component of the odor data according to the source of the odor (flower A, perfume B, fabric softener C, mouthwash D, etc.). As is known, the first principal component is generated as a linear combination of odor components such that the variance of the data is maximized for each odor source. The second principal component is generated as a linear combination of odor components such that the variance of the data projected on axes orthogonal to the first principal component axis is maximized.

FIG. 2 shows a set of odor data input to the first principal component analysis unit 10 from the sensors 1-8. This figure shows a case where the odor source is flower A. Each row in FIG. 2 shows a set of data acquired by each sensor in one observation. This example shows that each sensor has acquired learning data for a total of 2000 observations, from the first observation to the 2000th observation. Each row in FIG. 2 shows a set of data acquired by each sensor through a total of 2000 observations. In FIG. 2, only the learning data for the first observation is shown, and data values for the second and subsequent observations are omitted.

The first principal component analysis unit 10 extracts appropriate subsets of data from the set of data in FIG. 2 and generates first and second principal components for each subset. The subsets may be extracted, for example, as follows.

(Example 1) When the subsets are extracted as follows, 200 types of first and second principal component sets generated from learning data for ten observations are generated.

Subset 1: first learning data-tenth learning data
Subset 2: eleventh learning data-twentieth learning data
. . .
Subset 200: 1991st learning data-2000th learning data
(Example 2) When the subsets are extracted as follows, 40 types of first and second principal component sets generated from learning data for 50 observations are generated.
Subset 1: first learning data-fiftieth learning data
Subset 2: 51st learning data-100th learning data
. . .
Subset 40: 1951st learning data-2000th learning data
The method of extracting the subsets is arbitrary and may be determined based on computational complexity and accuracy.

The first image data generation unit 20 assigns, from among two or more principal components generated by the first principal component analysis unit 10, the first principal component to the X coordinate on the XY plane and the second principal component to the Y coordinate on the XY plane. Next, the first image data generation unit 20 renders a point on the XY plane with the first principal component as the X coordinate and the second principal component as the Y coordinate for each of the extracted subsets. Here, the pixel value of each point shall be an arbitrary value indicating the presence or absence of a point, such as binary. The first image data generation unit 20 renders the first and second principal components of multiple subsets on the XY plane and thereby generates data for a single image. This allows a "virtual image" corresponding to the odor source to be rendered on the XY plane. In other words, the first image data generation unit 20 generates virtual image data corresponding to the odor source.

Figure 3A:
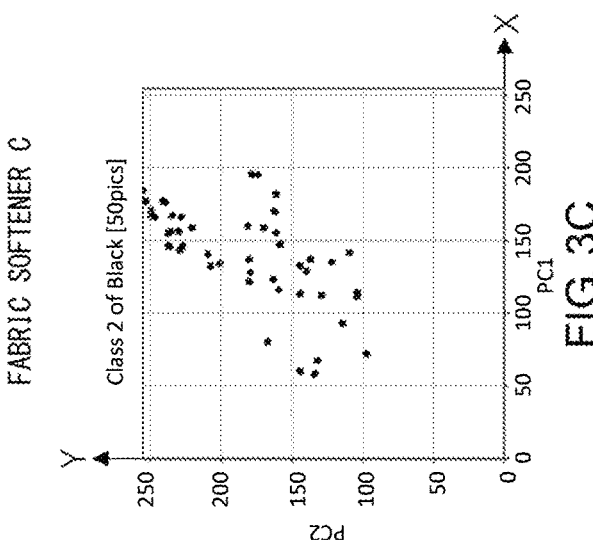
FIGS. 3A-3C are virtual images rendered from image data generated by a first image data generation unit of the machine learning device of FIG. 1, where
Figure 3B:
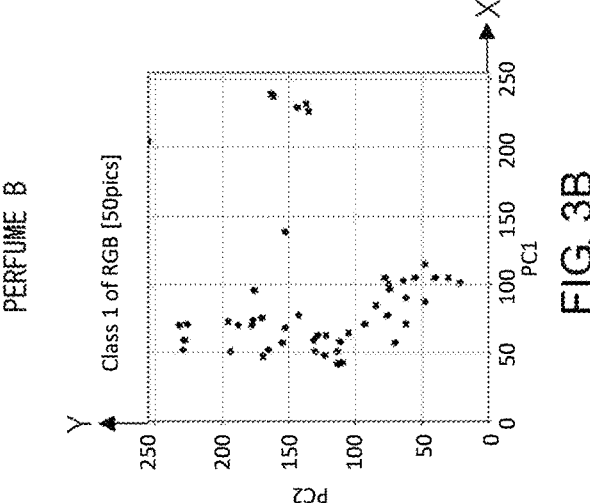
Figure 3C:
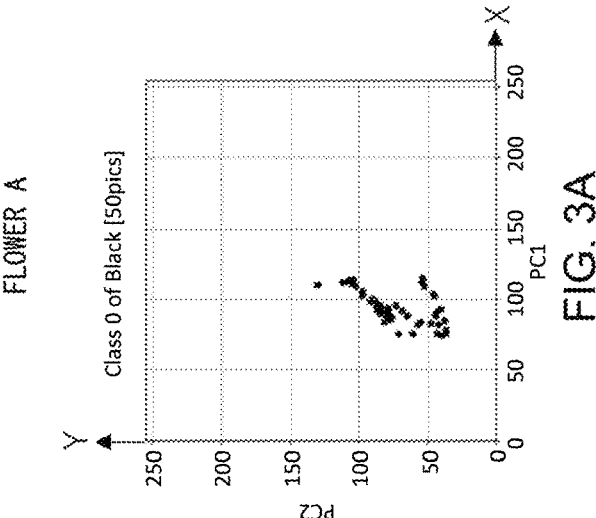

FIGS. 3A-3C show virtual images rendered from image data generated by the first image data generation unit 20. FIG. 3A is a virtual image when the odor source is flower A, FIG. 3B is a virtual image when the odor source is perfume B, and FIG. 3C is a virtual image when the odor source is fabric softener C. These images have been generated by plotting multiple points on the XY plane by performing a principal component analysis of the multiple subsets.

Since odor data is image data according to the source of the odor, the odor data is in a suitable form as input data for a neural network for image recognition.

The learning unit 30 performs learning using a neural network using the image data generated by the first image data generation unit 20 as input data. The learning may be supervised learning where training data in which the input data is labeled with the odor source is used or may be unsupervised learning. Thereby, given odor data, the first image data generation unit 20 generates a trained model for inferring what the odor source is and the state of the system. The neural network used by the learning unit 30 may be any suitable neural network for image recognition, such as GoogLeNet, ResNet, or Yolo.

The above explains an example in which the learning unit 30 performs learning using a neural network. However, this is non-limiting, and the learning unit 30 may generate trained models using machine learning techniques other than neural networks.

As described, since the original odor data is converted into image data, the data is suitable for a neural network for image recognition. That is, according to the present embodiment, a neural network suitable for image processing can be used to generate a trained model for inferring the state of a system from arbitrary learning data.

Second Embodiment

In one embodiment, by performing principal component analysis on learning data, the first principal component analysis unit 10 of the machine learning device 100 of FIG. 1 generates three or more principal components of the learning data. Of the three or more principal components that have been generated, the third principal component is generated as a linear combination of odor components such that the variance of the data projected on axes orthogonal to the first principal component axis and the second principal component axis is maximized.

The first image data generation unit 20 assigns, from among the three or more principal components generated by the first principal component analysis unit 10, the third principal component to a pixel value at each point on the XY plane in addition to assigning the first principal component to the X coordinate on the XY plane and the second principal component to the Y coordinate on the XY plane. This allows for the rendering of a virtual image on the XY plane that includes information on shading corresponding to the odor source (i.e., in grayscale). In other words, the first image data generation unit 20 generates virtual image data including information on the shading corresponding to the odor source.

Before generating the virtual image data, the first image data generation unit 20 may normalize the third principal component according to the resolution of the image. For example, the first image data generation unit 20 may normalize the data range of the third principal component to 0-255, 0-511, or 0-1023.

The learning unit 30 performs learning using a neural network using shading image data generated by the first image data generation unit 20 as input data.

According to the present embodiment, since image data input to a neural network for image recognition includes information on shading, it is possible to generate a trained model for inferring the state of a system with higher accuracy.

Third Embodiment

In one embodiment, by performing principal component analysis on learning data, the first principal component analysis unit 10 of the machine learning device 100 of FIG. 1 generates four or more principal components of the learning data. Of the four or more principal components that have been generated, the fourth principal component is generated as a linear combination of odor components such that the variance of the data projected on axes orthogonal to the first principal component axis, the second principal component axis, and the third principal component axis is maximized. In the same manner, the fifth principal component is generated as a linear combination of odor components such that the variance of the data projected on axes orthogonal to the first principal component axis, the second principal component axis, the third principal component axis, and the fourth principal component axis is maximized.

The first image data generation unit 20 assigns, from among the four or more principal components generated by the first principal component analysis unit 10, each of the third principal component and the subsequent principal components to a pixel value in each point on the XY plane and a color component value of a color space at each point on the XY plane in addition to assigning the first principal component to the X coordinate on the XY plane and the second principal component to the Y coordinate on the XY plane.

For example, the first image data generation unit 20 may assign the third principal component to the R value of the RGB color space at each point on the XY plane, the fourth principal component to the G value of the RGB color space at each point on the XY plane, and the fifth principal component to the B value of the RGB color space at each point on the XY plane. This allows for the rendering of a virtual image on the XY plane that includes information on a color corresponding to the odor source (i.e., full color). In other words, the first image data generation unit 20 generates virtual image data including information on the color corresponding to the odor source.

In the above, an RGB color space is used as an example for a color space in which the third and subsequent principal components are assigned. The color space in which the third and subsequent principal components are assigned is not limited to this and may be any color space such as CMYK or HSL. Further, when the first principal component analysis unit 10 generates principal components up to the Nth principal component, the (N−2)th and subsequent principal components may be assigned to respective color components in the color space.

Before generating the virtual image data, the first image data generation unit 20 may normalize each of the third and subsequent principal components according to the color resolution of the image. For example, the first image data generation unit 20 may normalize the data range of the third, fourth, and fifth principal components to 0-255, 0-511, or 0-1023.

Figure 4:
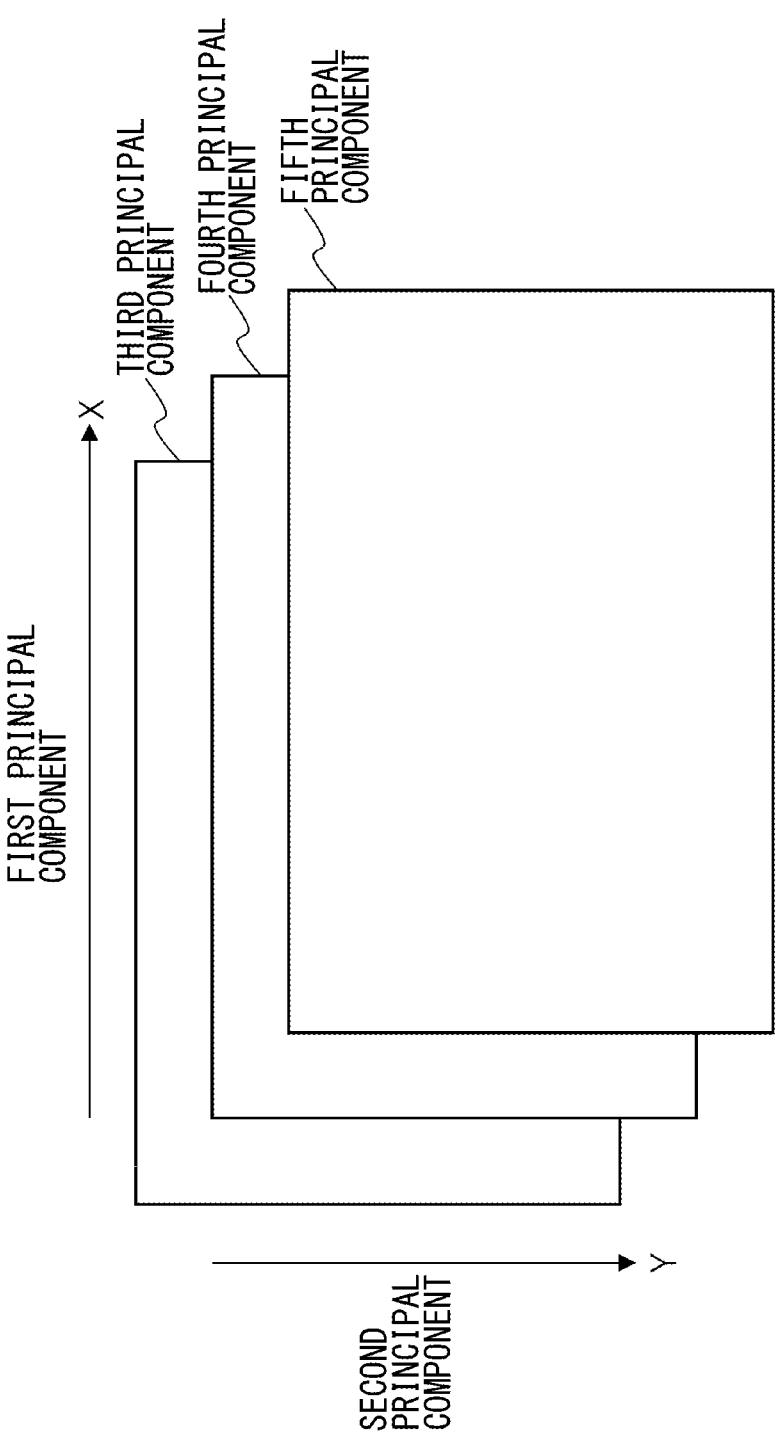
FIG. 4 is a schematic diagram of a first principal component, a second principal component, a third principal component, a fourth principal component, and a fifth principal component assigned to the XY plane by the first image data generation unit of the machine learning device of FIG. 1.

FIG. 4 schematically shows the first principal component, the second principal component, the third principal component, the fourth principal component, and the fifth principal component assigned to the XY plane by the first image data generation unit 20.

The learning unit 30 performs learning using a neural network using a color image data generated by the first image data generation unit 20 as input data.

According to the present embodiment, since image data input to a neural network for image recognition includes information on color, it is possible to generate a trained model for inferring the state of a system with even higher accuracy.

Fourth Embodiment

Figure 5:
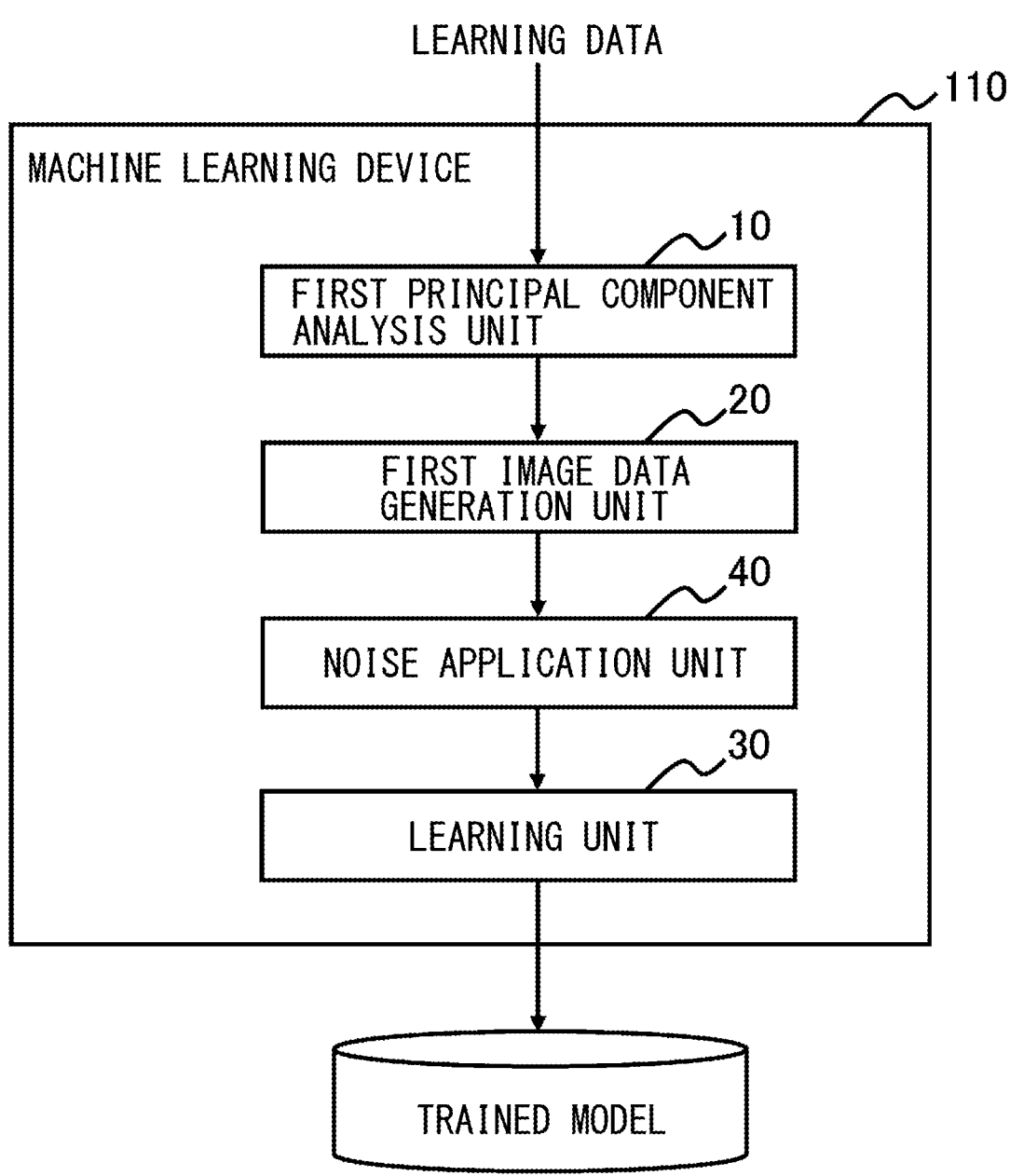
FIG. 5 is a functional block diagram of a machine learning device according to the fourth embodiment.

FIG. 5 is a functional block diagram of a machine learning device 110 according to the fourth embodiment. The machine learning device 110 includes a first principal component analysis unit 10, a first image data generation unit 20, a learning unit 30, and a noise application unit 40. In other words, the machine learning device 110 includes a noise application unit 40 in addition to the configuration of the machine learning device 100 shown in FIG. 1.

The noise application unit 40 applies noise to points around a point on the XY plane where virtual image data has been generated by the first image data generation unit 20.

A virtual image rendered by the method described above and corresponding to the odor source may be regarded as noise if, for example, the number of points corresponding to the pixels is not sufficiently large. In this case, by applying noise around the points corresponding to the pixels, a stochastic resonance phenomenon occurs, and the signal-to-noise ratio is improved.

Figure 6C:
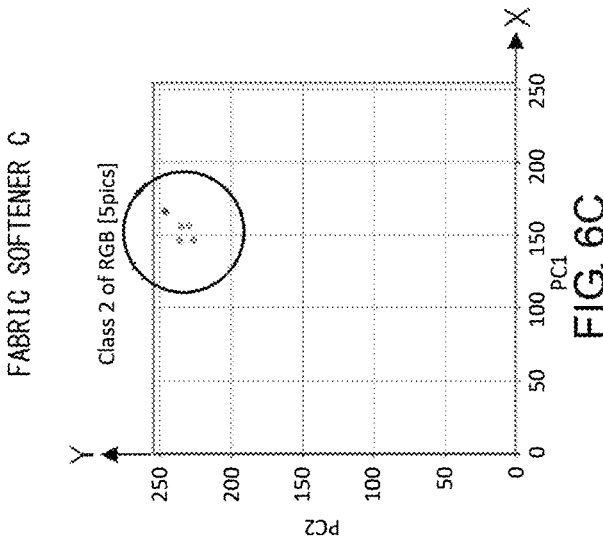
FIGS. 6A-6C are portions of the virtual images rendered from the image data generated by the first image data generation unit of the machine learning device of FIG. 5, where
Figure 6B:
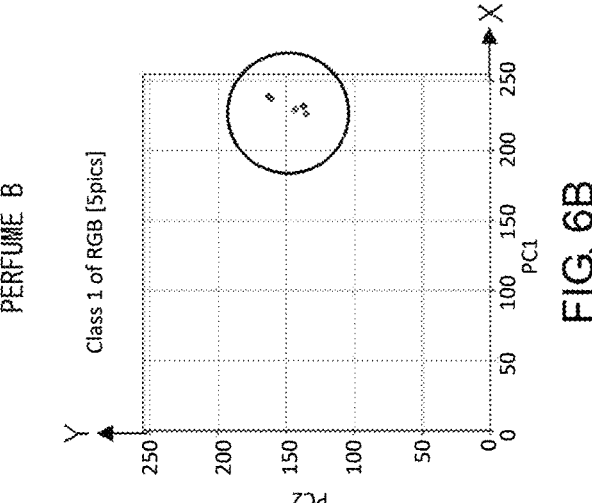
Figure 6A:
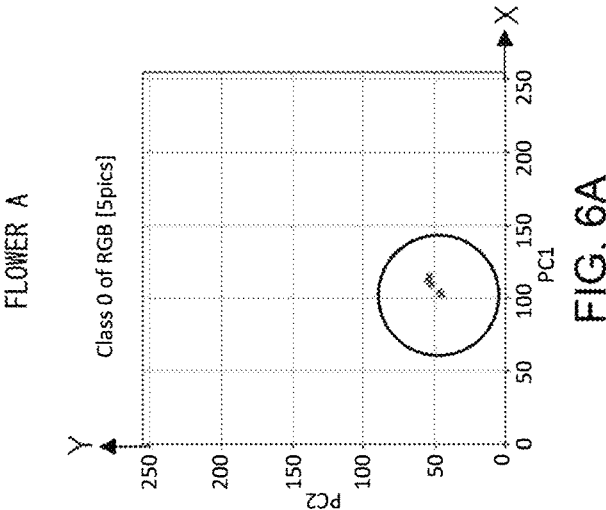

FIGS. 6A-6C show portions of virtual images rendered from image data generated by the first image data generation unit 20 of the machine learning device 110. FIG. 6A is a virtual image when the odor source is flower A, FIG. 6B is a virtual image when the odor source is perfume B, and FIG. 6C is a virtual image when the odor source is fabric softener C. The noise application unit 40 adds noise to points (the area surrounded by a circle) around a point rendered on the XY plane by the first image data generation unit 20.

According to the present embodiment, the accuracy of a trained model can be further improved by applying noise to points around each point constituting a virtual image rendered on the XY plane, using the stochastic resonance phenomenon.

The above explains an example of a trained model for inferring the state of a system based on odor data so as to determine what the odor source is. However, in an embodiment, a trained model may be generated from data other than this. For example, in an embodiment, a trained model may be generated that is for inferring or predicting weather conditions or air pollution based on meteorological data such as temperature, humidity, atmospheric pressure, atmospheric carbon dioxide concentration, and concentration of fine particulate matter in the air.

The various processes of a machine learning device explained above can be realized as a device using hardware such as a CPU and memory. Alternatively, the processes can be implemented by firmware stored in a read-only memory (ROM), a flash memory, etc., or by software on a computer, etc. The firmware program or the software program may be made available on, for example, a computer readable recording medium. Alternatively, the programs may be transmitted to and/or received from a server via a wired or wireless network. Still alternatively, the programs may be transmitted and/or received in the form of data transmission over terrestrial or satellite digital broadcast systems.

Fifth Embodiment

Figure 7:
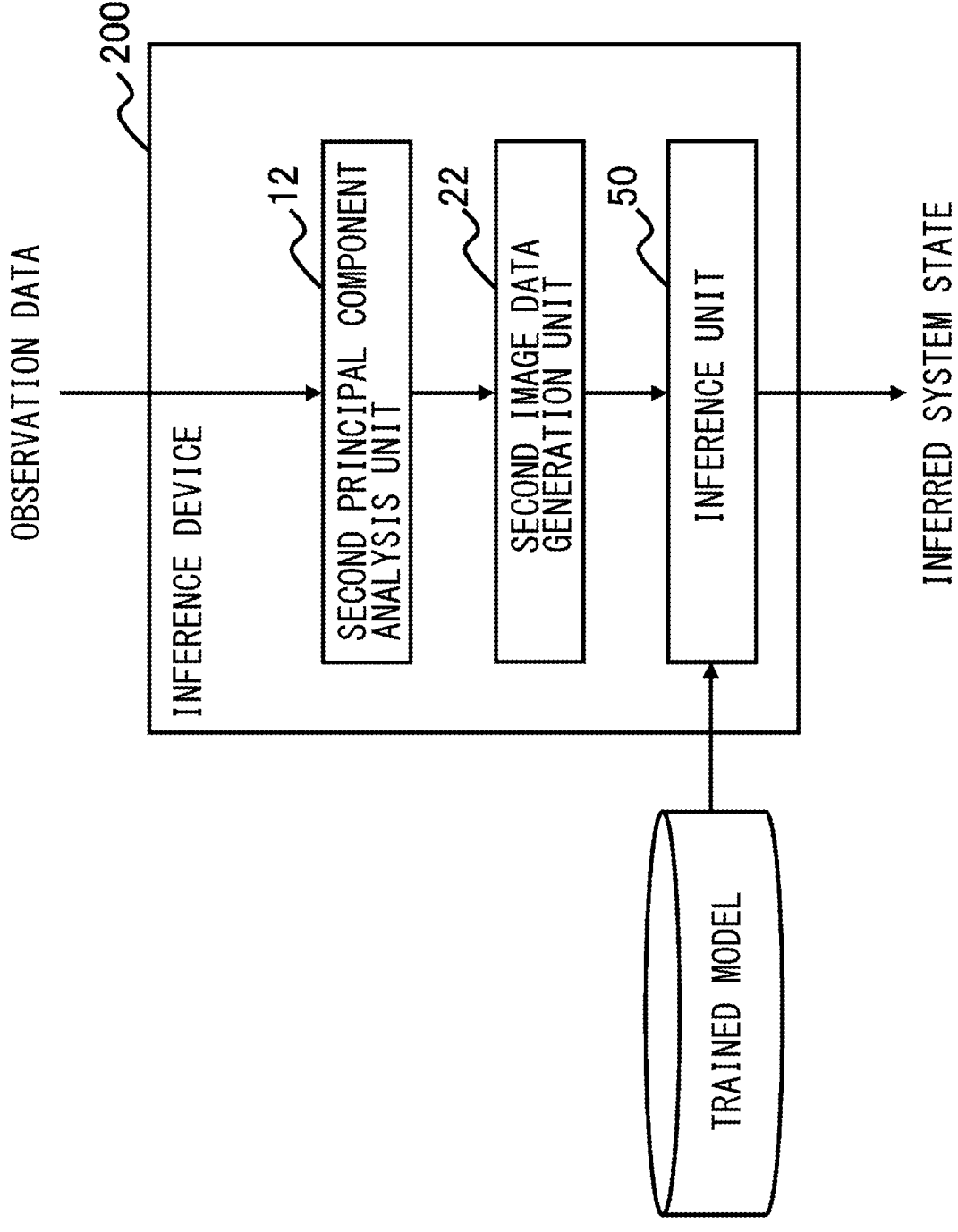
FIG. 7 is a functional block diagram of an inference device according to the fifth embodiment.

FIG. 7 is a functional block diagram of an inference device 200 according to the fifth embodiment. The inference device 200 includes a second principal component analysis unit 12, a second image data generation unit 22, and an inference unit 50.

Observation data from outside is input to the second principal component analysis unit 12. By performing principal component analysis on this data, the second principal component analysis unit 12 generates two or more principal components of the observation data. The second image data generation unit 22 assigns, from among two or more principal components generated by the second principal component analysis unit 12, the first principal component to the X coordinate on the XY plane and the second principal component to the Y coordinate on the XY plane and thereby generates virtual image data for inference. The inference unit 50 estimates the state of the system by applying the trained model to the image data generated by the second image data generation unit 22.

The trained model may be, for example, a trained model generated by the machine learning device 100 or the machine learning device 110 described above. The trained model may be stored in a memory unit provided inside the inference device 200 or may be downloaded from a database or the like outside the inference device 200.

According to the present embodiment, the state of a system can be estimated from observation data, using trained model.

Sixth Embodiment

Figure 8:
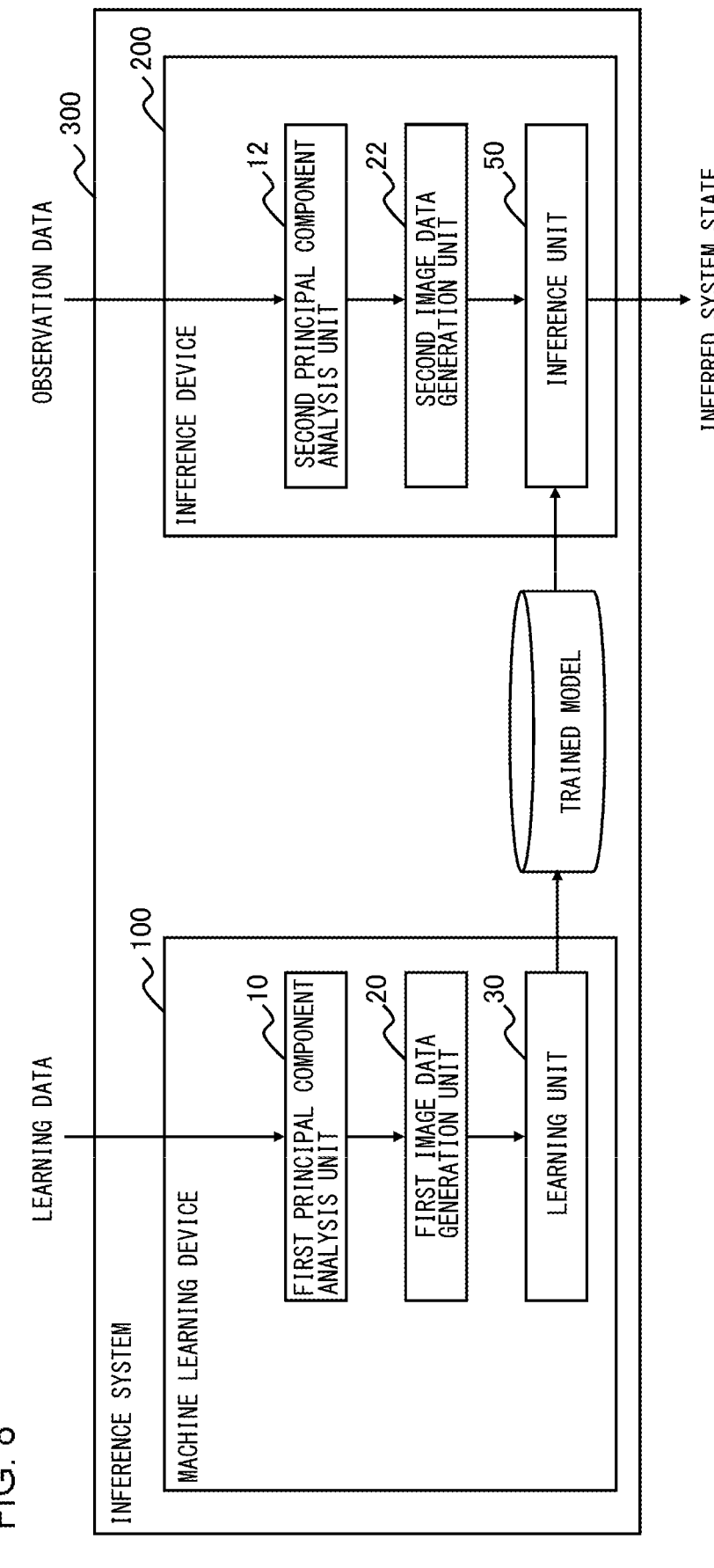
FIG. 8 is a functional block diagram of an inference system according to the sixth embodiment.

FIG. 8 is a functional block diagram of an inference system 300 according to the sixth embodiment. The inference system 300 includes a machine learning device 100 and an inference device 200. The machine learning device 100 is explained in the first embodiment and includes a first principal component analysis unit 10, a first image data generation unit 20, and a learning unit 30. The operation of the machine learning device 100 is as explained in the first embodiment. The inference device 200 is explained in the fifth embodiment and includes a second principal component analysis unit 12, a second image data generation unit 22, and an inference unit 50. The operation of the inference device 200 is as explained in the fifth embodiment.

The first and second principal component analysis units and the first and second image data generation units may be realized by the same or separate hardware or may be implemented as the same or separate software. In other words, the inference system 300 may be formed using common principal component analysis units and common image data generation units.

According to the present embodiment, the state of a system can be estimated from observation data, using trained model generated by a neural network suitable for image processing.

Seventh Embodiment

Figure 9:
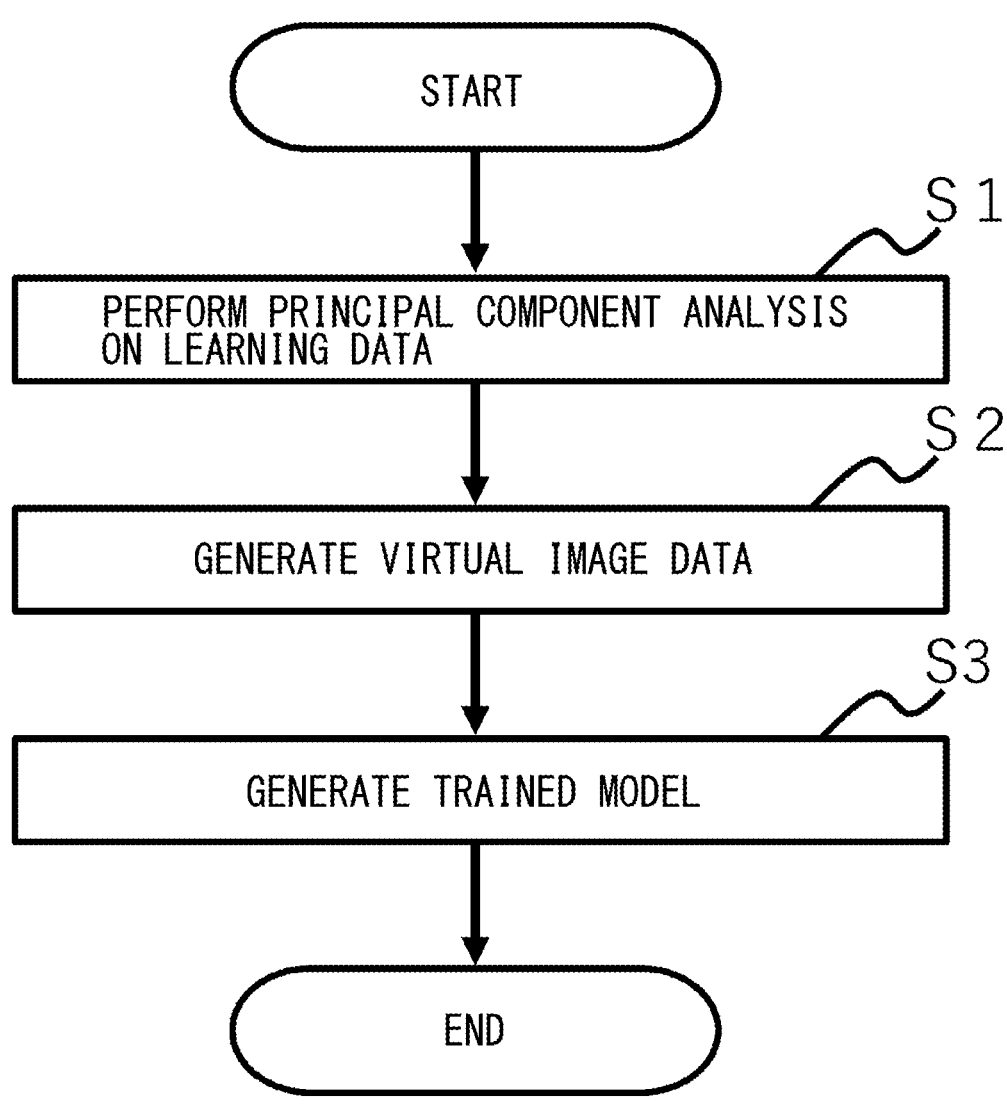
FIG. 9 is a flowchart explaining the procedure for generating a trained model according to the seventh embodiment.

FIG. 9 is a flowchart explaining the procedure for generating a trained model according to the seventh embodiment.

First, in the present method, by performing principal component analysis on learning data using the first principal component analysis unit, two or more principal components of the learning data are generated (S1).

Next, in the present method, from among two or more principal components generated in S1, the first principal component is assigned to the X coordinate on the XY plane, and the second principal component is assigned to the Y coordinate on the XY plane so as to thereby generate virtual image data, using the first image data generation unit (S2).

Next in the present method, using a learning unit, a trained model is generated by performing learning using a neural network using the image data generated in S2 as input data (S3).

According to the present embodiment, a neural network suitable for image processing can be used to generate a trained model for inferring the state of a system.

Eighth Embodiment

The eighth embodiment relates to a computer program. This program includes computer-implemented modules including: performing principal component analysis on learning data so as to thereby generate two or more principal components of the learning data; generating virtual image data by assigning, from among the two or more generated principal components, the first principal component to the X coordinate of an XY plane and the second principal component to the Y coordinate of the XY plane; and generating a trained model by performing learning using a neural network using the generated image data as input data.

According to the present embodiment, a program for generating a trained model for inferring the state of a system using a neural network suitable for image processing can be implemented as software.

Described above is an explanation of the present invention based on the embodiments. The embodiments are intended to be illustrative only, and it will be obvious to those skilled in the art that various modifications to constituting elements and processes could be developed and that such modifications are also within the scope of the present invention.

What is claimed is:

1. A machine learning method comprising:
   a first principal component analysis step configured to perform principal component analysis on learning data to generate two or more principal components of the learning data;
   a first image data generation step configured to generate first virtual image data by assigning, from among the two or more principal components, the first principal component to an X coordinate of an XY plane, a second principal component to a Y coordinate of the XY plane, and a third principal component to a pixel value at each point on the XY plane; and a learning step configured to generate a first trained model by performing machine learning using the generated first virtual image data as input data.

2. The machine learning method according to claim 1, wherein the first image data generation step is further configured to assign each of the fourth and subsequent principal components to pixel value at each point on the XY plane and a color component value of a color space at each point on the XY plane of the first virtual image data.

3. The machine learning method according to claim 2, comprising: a noise application step configured to apply noise to points around a point on the XY plane on which the virtual image data is generated.

4. The machine learning method according to claim 1, comprising: a noise application step configured to apply noise to points around a point on the XY plane on which the virtual image data is generated.

5. An inference method comprising:
   a second principal component analysis step configured to perform principal component analysis on observation data to generate two or more principal components of the observation data;
   a second image data generation step configured to generate second virtual image data by assigning, from among the two or more principal components, a first principal component to an X coordinate of an XY plane, the second principal component to a Y coordinate of the XY plane, and a third principal component to a pixel value at each point on the XY plane; and
   an inference step configured to perform inference using a trained model using the generated second virtual image data as input data.

6. A non-transitory program recording medium comprising a trained model generated by:
   performing principal component analysis on learning data to generate two or more principal components of the learning data;
   generating first virtual image data by assigning, from among the two or more principal components, a first principal component to an X coordinate of an XY plane, a second principal component to a Y coordinate of the XY plane, and a third principal component to a pixel value at each point on the XY plane; and
   generating a first trained model by performing machine learning using the generated first virtual image data as input data.

* * * * *